(12) United States Patent
McCanna et al.

(10) Patent No.: US 6,475,294 B2
(45) Date of Patent: Nov. 5, 2002

(54) SUBSEA PIG RELOADER

(75) Inventors: Jason McCanna, Houston; Jay S. Mandke, Katy, both of TX (US)

(73) Assignee: Kellogg Brown & Root, Inc., Houston, TX (US)

( * ) Notice: Subject to any disclaimer, the term of this patent is extended or adjusted under 35 U.S.C. 154(b) by 0 days.

(21) Appl. No.: 09/898,429

(22) Filed: Jul. 2, 2001

(65) Prior Publication Data

US 2002/0053354 A1 May 9, 2002

Related U.S. Application Data

(63) Continuation-in-part of application No. 09/714,334, filed on Nov. 16, 2000.
(60) Provisional application No. 60/246,769, filed on Nov. 8, 2000.

(51) Int. Cl.[7] .............................. B08B 1/00; B08B 9/04; F16L 55/00
(52) U.S. Cl. ....................... 134/8; 15/104.062
(58) Field of Search ................ 134/8; 15/3–5, 15/3.51, 104.062

(56) References Cited

U.S. PATENT DOCUMENTS

| | | | | |
|---|---|---|---|---|
| 3,175,240 A | * | 3/1965 | Hillard | .................. 15/104.062 |
| 5,139,576 A | * | 8/1992 | Davis | ............................. 134/8 |
| 5,913,637 A | * | 6/1999 | Rajabali et al. | ............. 405/169 |
| 6,022,421 A | * | 2/2000 | Bath et al. | ...................... 134/8 |

OTHER PUBLICATIONS

Mike Cunningham, "Remotely Operable Subsea Pig Launcher", ASME International publication (2001).

Oceaneering Intervention Engineering Publication "Multiple Pig Launcher", (2001).

* cited by examiner

Primary Examiner—Zeinab El-Arini
(74) Attorney, Agent, or Firm—Conley, Rose & Tayon, P.C.

(57) ABSTRACT

A system for supplying pigs to a subsea pig launcher using a system carried and controlled by a remotely operated vehicle. The pigs are carried in racks that hold multiple pigs. The racks are extended and the pigs are allowed to drop into the barrel of the subsea pig launcher. The system is also equipped with a system that retracts the racks if hydraulic and electrical power is lost during the reloading process so that the remotely operated vehicle can be retrieved to the surface safely. The reloading process can be carried out by a remotely operated vehicle support vessel without the need for heavy lifting equipment or a large deck area.

15 Claims, 4 Drawing Sheets

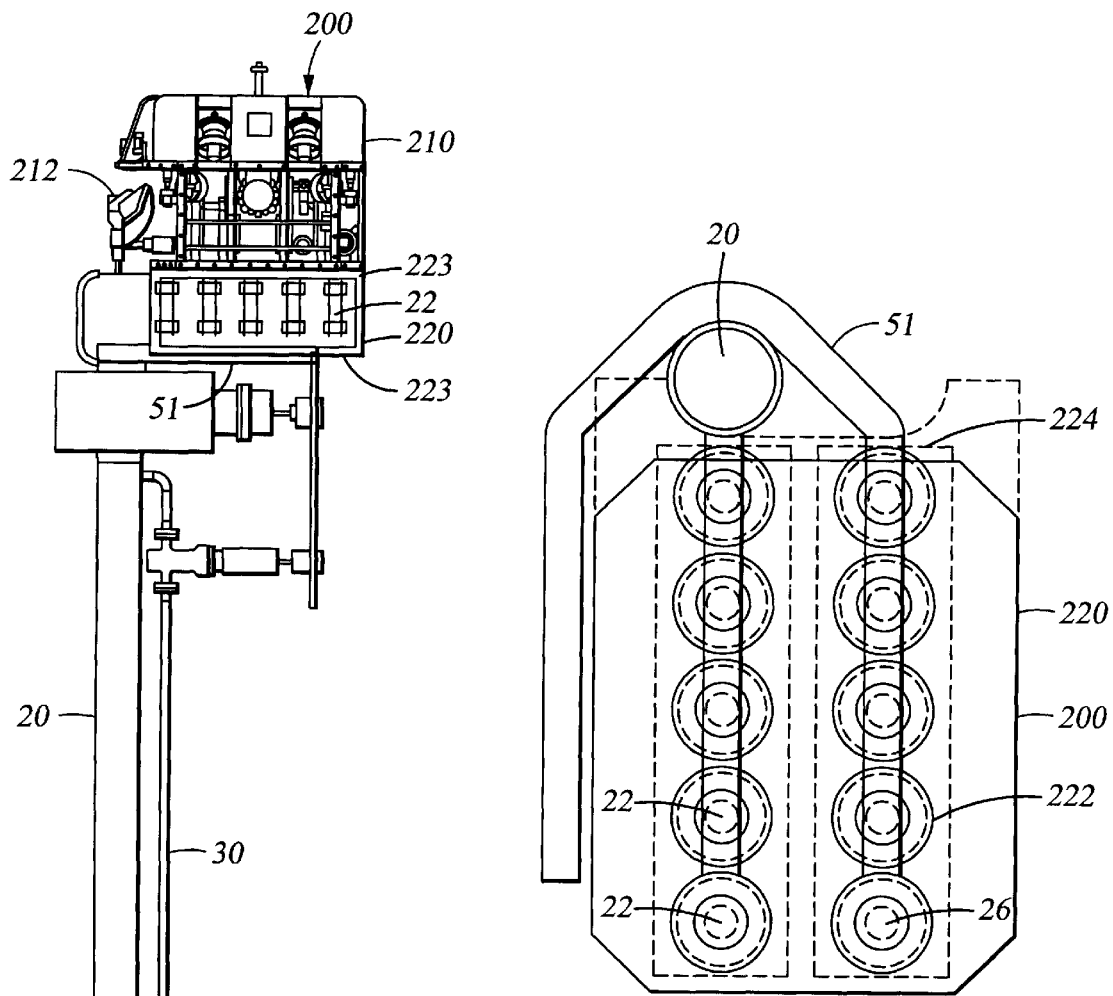
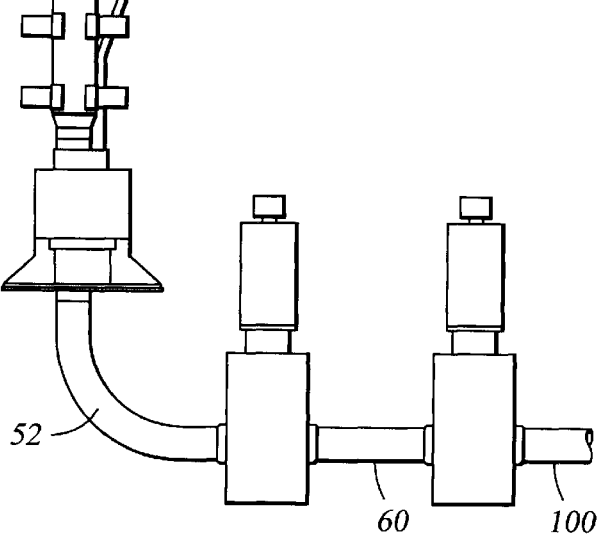
Fig. 5
Fig. 4

SUBSEA PIG RELOADER

CROSS-REFERENCE TO RELATED APPLICATIONS

This is a continuation-in-part application of U.S. patent application Ser. No. 09/714,334, filed Nov. 16, 2000 and entitled "Subsea Pig Launcher," and claims the benefit of 35 U.S.C. 119(e) of U.S. Provisional Application Serial No. 60/246,769, filed Nov. 8, 2000 and entitled "Subsea Pig Launcher," both of which are hereby incorporated herein by reference

STATEMENT REGARDING FEDERALLY SPONSORED RESEARCH OR DEVELOPMENT

Not applicable.

TECHNICAL FILED OF THE INVENTION

The present invention relates generally to subsea pig launching, and more particularly to a method and apparatus for storing and sequentially launching multiple pigs from a remote location. Still more particularly, the present invention is a method and apparatus for delivering pigs to a remote subsea pig launching apparatus.

BACKGROUND OF THE INVENTION

In the oil and gas industry, it is common to remove petroleum deposits and other debris from pipelines by pushing a cylindrical scraper, referred to as a "pig," through the lines using fluid pressure. The pig is introduced into the pipeline from a launching system that typically includes a releasable retainer for retaining the unlaunched pig and a source of fluid pressure connected to the housing behind the pig.

Subsea satellite wells, manifolds or templates in deepwater are typically connected to a host platform located in shallow water via subsea flowlines that transport the produced hydrocarbon fluid along the sea floor. Such systems are often referred to as "tie-back" systems. As with other types of pipelines, flowlines in tie-back systems need to be pigged periodically during their operation to remove paraffin deposits, displace liquids, etc. The traditional method of pigging such flowlines has been to use "round trip pigging," which requires a pair of parallel flowlines between the host platform and the manifold or the wellhead. Pigs are typically launched from and received at the host platform, traveling outward through one flowline and returning through the other.

A more economical option for deepwater flowlines is to use "single trip pigging" using a single flowline between the manifold and the host platform. In single trip pigging, the pigs are launched from a pig launcher mounted on the subsea manifold and received on the host platform. The pig launcher can also be mounted on a wellhead or a pipeline end manifold (PLEM) sled, which is connected to production manifold/wellhead via jumpers.

In order to maximize the advantage of a single trip pigging system, the cost of offshore intervention in the system should be minimized. Such intervention is required either to replace the pigs in the launcher or to retrieve the launcher and recharge it with a new set of pigs after the previous set has been launched into the flowline. This implies that the pig launcher should be able to hold a large number of pigs and, for deepwater application, all pigging operations should be performed using an ROV or remotely from the host platform. Hence, it is desired to provide a reloading apparatus that can be used in conjunction with an ROV and can carry and deploy several pigs into a subsea pig launching apparatus.

Furthermore, depending on the pigging operation frequency, the pigs are likely to be left in the launcher over a long period, as much as one to two years. However, since conventional pigs tend to degrade when exposed to hydrocarbons or methanol for a long period, conventional pigs cannot be left exposed to hydrocarbons or methanol while they are stored in the pig launcher. Hence, it is further desired to provide a pig launching system that does not store the pigs in either production fluids or methanol.

BRIEF SUMMARY OF THE INVENTION

The present invention provides an apparatus for launching pigs into a subsea flowline that connects a subsea manifold, template or a wellhead to a host platform and provides a reloading apparatus that can be used in conjunction with an ROV and can carry several pigs and deploy them remotely into a subsea pig launching apparatus.

The subsea pig launcher described herein addresses the issues identified above. While the subsea pig launcher is described in the following discussion as being installed on a manifold, the present apparatus can be easily adapted for other applications, such as pigging from a subsea wellhead, template or a pipeline end manifold (PLEM) sled at the end of flowline.

More particularly, a method and apparatus have been developed for loading multiple pigs into a subsea pig launcher barrel, storing them inside the barrel over an extended period of time and then releasing the pigs remotely, one at a time, into a subsea flowline or pipeline as needed. The inside diameter of the launcher barrel is preferably slightly larger than the outside diameter of the pigs, so as to allow easy movement of pigs inside the barrel. Since the pigs are pushed inside the barrel by a positive fluid pressure, the system can operate even with the barrel made to fit the pig outside diameter. The top or rearmost pig is constructed so that its outside diameter seals against the inside wall of the barrel, and is therefore referred to as the "piston pig."

The pigs are advanced inside the barrel by providing hydraulic fluid under pressure behind the piston pig. This advances the stored pigs until the foremost pig is adjacent to a chamber called the "pig parking chamber" at the bottom of the barrel. The entrance of the pig parking chamber can be opened to allow the foremost pig to enter the chamber. In the chamber, the foremost pig is held between two pig stops. A kicker line connected to the parking chamber is provided for pumping hydraulic fluid behind the parked pig. By releasing the lower pig stop and pumping hydraulic fluid under pressure through the kicker line, the foremost pig can be launched into another chamber called the "pig launching chamber." The pig launching chamber preferably has an isolation valve at each end, which isolates it from the production header and flowline on one side and the pig parking chamber on the other side. A production kicker line connected to the launching chamber permits introduction of production fluids (hydrocarbons) behind the pig inside the launching chamber. The hydraulic fluid to be used for pushing pigs can be similar to the control fluids conventionally used for subsea systems, or can be any other suitable fluid that has a density greater than seawater, is environmentally acceptable, and is chemically non-reactive with the pig material.

From the launching chamber, the pig is pushed into the production header by opening the isolation valve between the production header and the launching chamber. Once the pig travels from the production header into the flowline, the isolation valve between the launching chamber and the production header is closed. The launching chamber is preferably then flushed with methanol and then, if required, with hydraulic fluid to wash out the residual hydrocarbon fluids.

Additional pigs can be loaded using a pig reloading system. The pig reloading system is adapted to be carried and controlled by an ROV. At the surface, new pigs are loaded into a rack that holds multiple pigs. The pig reloading system, and ROV, are lowered to a subsea pig launcher and attach to a specially designed platform at the top of the barrel. This platform orients the ROV and enables the ROV to maintain the proper position throughout the reloading process. The launcher barrel is opened by the ROV and the pig reloading system uses hydraulic power supplied by the ROV to extend a rack of pigs over the barrel. As the rack extends, the pigs move over the opening of the barrel and are allowed to fall into the barrel. Once the desired number of pigs are loaded, the ROV closes the barrel and returns to the surface. The pig reloading system may be equipped with multiple racks in order to increase the number of pigs loaded during a single trip. The pig reloading system is also preferably equipped with a safety system that ensures that the pig reloading system is fully retracted if hydraulic and electrical control is lost.

The apparatus of the present invention, and in particular the ROV mounted pig reloading system provides several useful advantages over conventional systems. By being able to reload pigs from the surface using only an ROV, the subsea pig launcher can be supplied with pigs using only an ROV support vessel and does not require heavy lifting equipment or a large deck area.

BRIEF DESCRIPTION OF THE DRAWINGS

For a more detailed understanding of the preferred embodiments, reference is made to the accompanying Figures, wherein:

FIG. 4 is a schematic side elevation of a preferred embodiment of pig transfer equipment used in conjunction with the apparatus of FIG. 1;

FIG. 5 is a schematic plan view of the pig transfer equipment of FIG. 4; and

DETAILED DESCRIPTION OF THE PREFERRED EMBODIMENTS

Figure 1:
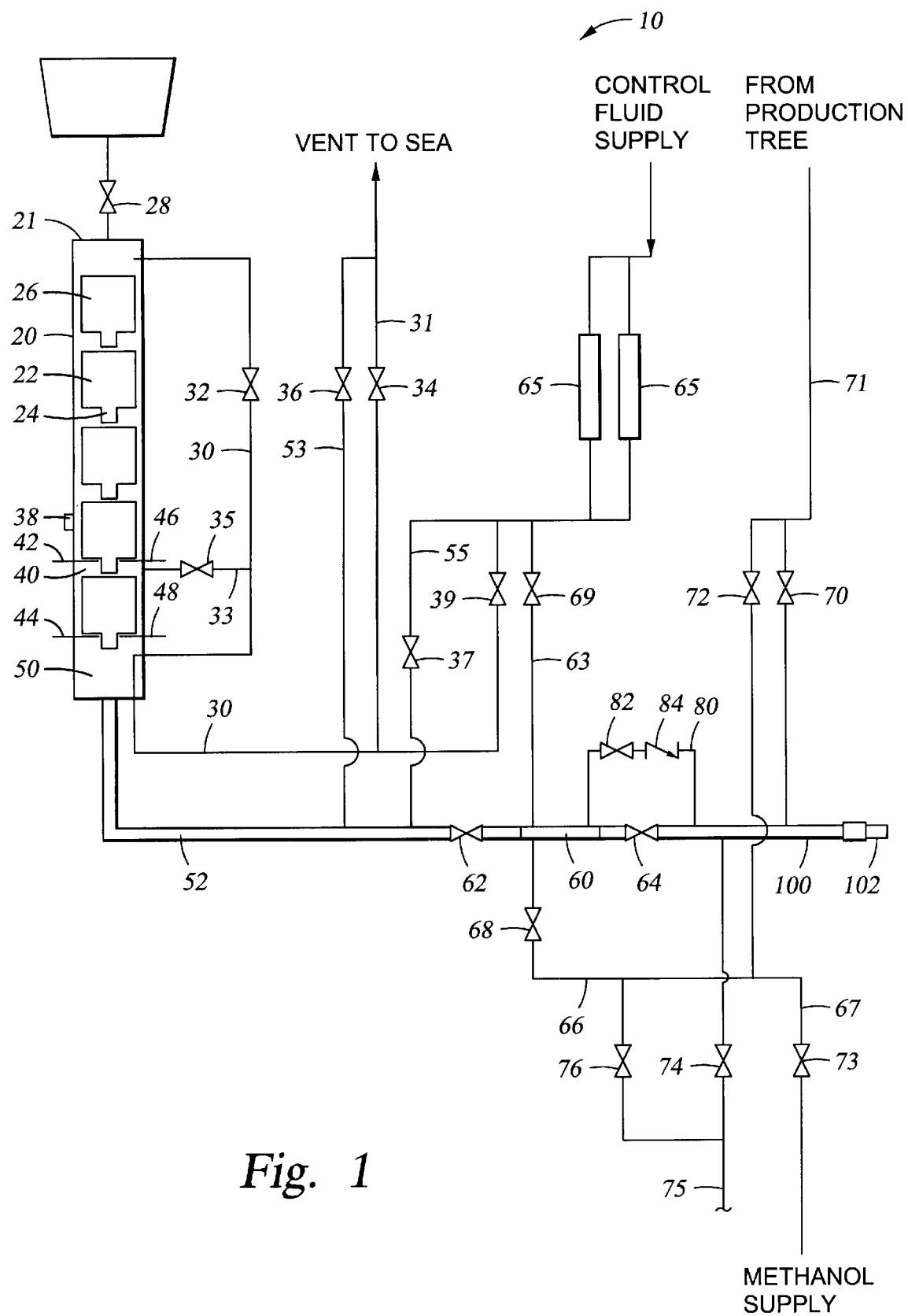
FIG. 1 is a schematic illustration of an apparatus constructed in accordance with a preferred embodiment of the present invention.

Referring initially to FIG. 1, a preferred embodiment of the present subsea pig launcher assembly 10 includes a pig storage barrel 20, which is preferably sized and configured to receive a ten to twelve pigs 22 stacked end to end. Although the discussion that follows and the attached Figures show barrel 20 installed on the manifold in vertical orientation, it will be understood that the system can be adapted for horizontal or inclined orientation of barrel 20. The inside diameter of barrel 20 is preferably slightly greater than the outside diameter of the pigs. This facilitates easy movement of pigs inside the barrel.

Figure 2:
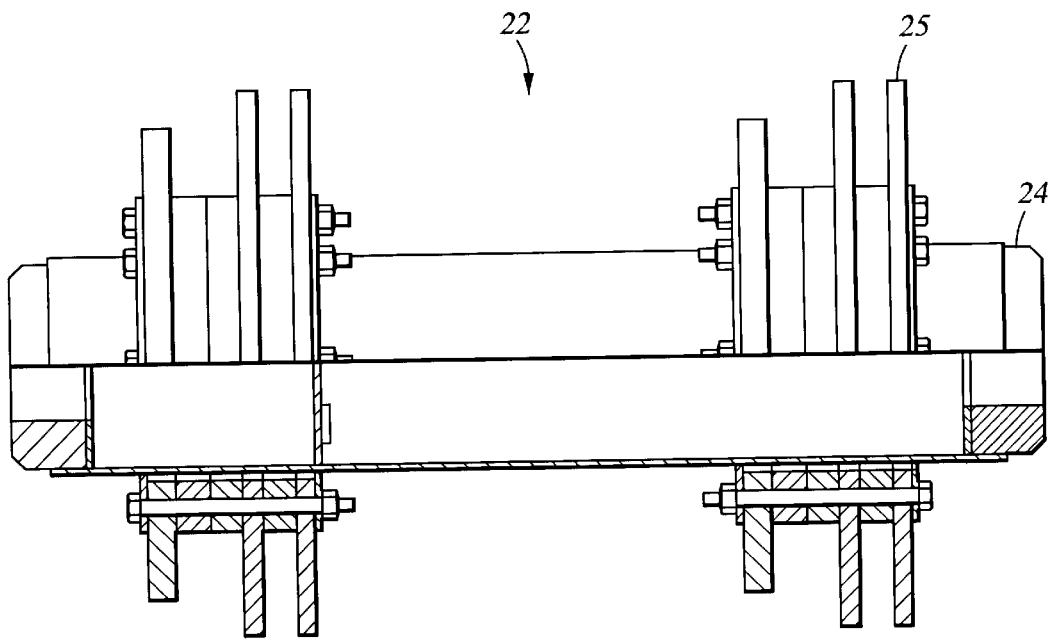
FIG. 2 is a side view, partially in cross-section, of a preferred pig configuration suitable for use in the apparatus of FIG. 1.
Figure 3:
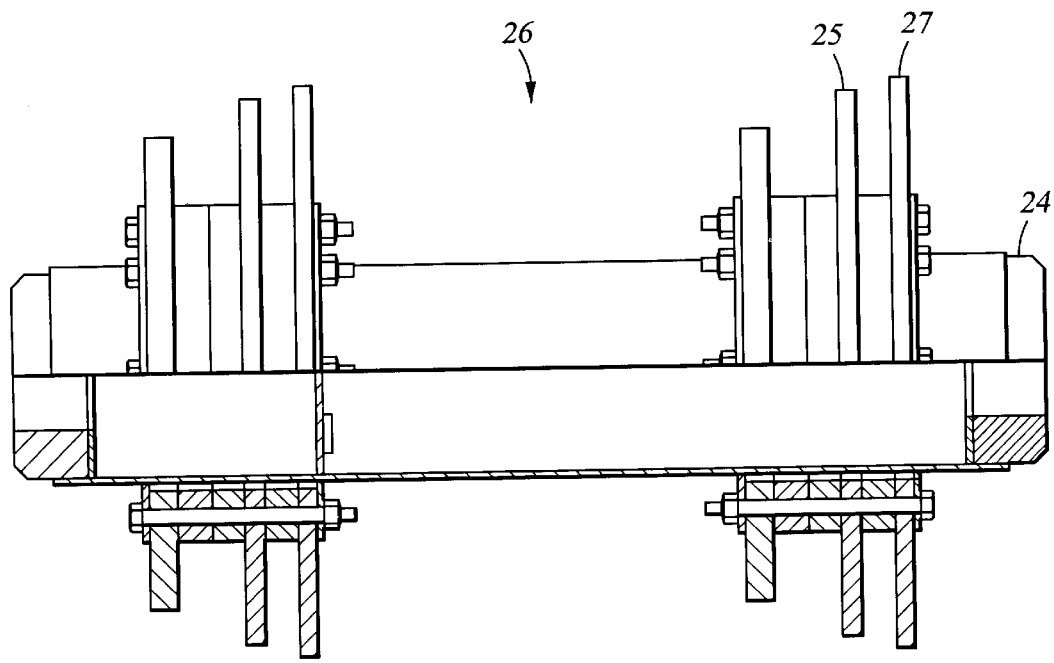
FIG. 3 is a side view, partially in cross-section, of a preferred piston pig configuration suitable for use in the apparatus of FIG. 1.

Referring briefly to FIGS. 2 and 3, in a preferred embodiment, pigs 22 each have an extending nose section 24, which facilitates stacking them directly and maintains a space between their radially extending fins 25. The pigs 22 may be of any style or manufacture known in the art and used in pipeline pigging operations. Each pig 22 may be fitted with any of various pipeline-cleaning or other special devices around its circumference, such as are known in the art.

Referring now to FIGS. 1 and 3, the last pig near the top of the barrel has a larger diameter fin 27 than the other pigs 22 and fits snugly and sealingly inside barrel 20 and is thus referred to as a piston pig 26. A preferred piston pig 26 is described in U.S. patent application Ser. No. 09/898,427, submitted concurrently with the present application. At the top of barrel 20 is a valve 28, which closes the inlet end 21 of barrel 20. Other types of closures can be used in place of valve 28. When valve 28 is open, pigs 22 can be loaded into barrel 20. A debris cap (not shown) above the valve is used to protect the valve inlet. It is preferred that valve 28 be operated "manually," although it is also contemplated that valve 28 could be remotely actuable.

If desired, a magnetic sensor 38 mounted on the barrel detects the passage of the piston pig, which includes a preinstalled magnet. Sensor 38 can be used to send a signal to inform the operator to reload a new stack of pigs into the barrel. It will be understood that other types of sensing devices can be used to sense the passage of the piston pig and that sensor 38 can alternatively be mounted at other suitable points along the launching apparatus 10.

Below pig storage barrel 20 is the pig parking chamber 40. Parking chamber 40 is defined by an upper pig stop 42 and a lower pig stop 44. Pig stops 42, 44 are preferably spaced one pig length apart. A spare set of pig stops 46, 48 can be provided as a backup. All pig stops are preferably provided with actuators for remote operation. The inside diameter of parking chamber is preferably selected to substantially fit the pig outside diameter. A parking chamber kicker valve 35 allows hydraulic fluid under pressure to flow behind the pig inside the parking chamber so as to push it out of the chamber when lower pig stop 44 is released.

A hydraulic line 30 connected near the top of barrel 20 allows hydraulic fluid or control fluid to be introduced under pressure behind the piston pig 26. Hydraulic line 30 is controlled by a remotely actuated valve 32. Providing hydraulic or control fluid under pressure behind piston pig 26 advances piston pig 26 and the other pigs down the barrel. A branch line 33 controlled by a valve 35 connects hydraulic line 30 to pig parking chamber 40. At its other end, hydraulic line 30 connects to vent line 31, which is controlled by valve 34, and to a fluid supply system that includes fluid accumulators 65, a direct fluid supply line, or other possible configuration. A valve 39 controls fluid flow to line 30. Thus, hydraulic line 30 can also be used as a vent line for discharging the seawater from barrel 20 during loading of pigs into the barrel. As mentioned above, the hydraulic or control fluid to be used for pushing pigs can be similar to the control fluids conventionally used for subsea systems, or can be any suitable fluid that has a density greater than seawater, is environmentally acceptable, and is chemically non-reactive with the material (polyurethane) used in pigs.

At the bottom of the barrel is the hub of a dual bore mechanical connector 50 (collet type or alternate), which attaches the barrel to the system downstream on the manifold. Docking guides a soft landing system (not shown) and an alignment funnel (not shown) are preferably included to ensure proper orientation of the respective hubs during the connector makeup. Connector 50 is hydraulically operated to make-up and break the connection between storage barrel 20 and the manifold. The dual bore connector 50 provides a connection between barrel 20 and manifold pipe 52 connected to the flowline header for the pig transfer and also between the hydraulic line 30 on the manifold pipe 52 and on the launcher.

A vent line 53 is preferably provided on manifold pipe 52 and is controlled by valve 36. Hence, valves 34 and 36 allow venting of fluids from the launcher barrel from the bottom and the top, respectively, as explained in detail below. Similarly, a fluid supply line 55 provides hydraulic or control fluid under pressure from accumulators 65 to manifold pipe 52. As disclosed above, direct hydraulic supply from hoses connected to the host platform can provide adequate fluid supply in some cases. Flow through line 55 is controlled by valve 37.

Downstream of manifold pipe 52, is a pig launching chamber 60. Upstream and downstream isolation valves 62, 64, respectively, enclose the ends of the launching chamber 60. A flush line 63, which is controlled by valve 69, connects the upstream end of launching chamber 60 to the supply of control or hydraulic fluid 65. The downstream end of launching chamber 60 is preferably connected via valve 64 to the manifold production header 100, which in turn connects to the subsea flowline 102. A plurality of production lines 71, 75 feed produced hydrocarbons from wells into production header 100 downstream of valve 64. Fluid flow through lines 71, 75 into production header 100 is controlled by valves 70, 74, respectively. In a preferred embodiment, each production line also supports a branch line that feeds produced fluids into a kicker line 66, which communicates with the upstream end of launching chamber 60. These branch lines are controlled by branch valves 72, 76, respectively. Production fluids from the wells can be introduced into pig launching chamber 60 via kicker line 66. If desired, a methanol feed line 67 can also be connected to kicker 66, with fluid flow being controlled by a valve 73. A remotely activated valve 68 controls fluid flow through kicker line 66. A crossover connection 80 between launching chamber 60 and production header 100 via a remotely operated valve 82 and a check valve 84 allows fluids to flow from launcher barrel 60 into the production header 100 while bypassing valve 64.

Upstream of valve 62, hydraulic fluid under pressure from accumulators 65 or hydraulic line 30 can be introduced into pig storage barrel 20. Hydraulic line 31 and vent valve 34 permit draining of fluids from the bottom of the barrel.

In one preferred embodiment all valves except valve 28 are remotely operated and valve 28 is operated by remotely operated vehicle. In an alternative embodiment, all valves are ROV operable.

According to a preferred embodiment of the present invention, a remotely operated vehicle (ROV) 200 is fitted with a pig loader that is adapted to transport a plurality of pigs to the location of barrel 20. Referring now to FIGS. 4 and 5, ROV 200 includes a vehicle body 210 having at least one maneuverable appendage 212 thereon. In accordance with the invention, ROV 200 can be any suitable remotely operable subsea vehicle, such as are known in the art. A pig loader 220 is preferably mounted on the underside of ROV 200. Pig loader 220 is preferably mounted below or next to vehicle body 210, so that it can be aligned with an opening at the top of pig storage barrel 20. Pig loader 220 preferably has a size and configuration that allows it to be connected to an ROV using standard connections, and connects to ROV 200 by conventional means.

Pig loader 220 preferably includes a plurality of canisters 222 that are sized and shaped to receive the desired pigs. Canisters 222 preferably have open tops and bottoms. According to a preferred embodiment, canisters 222 are supported in two or more racks 224, with each rack holding a row of vertical canisters. In a preferred embodiment, each canister contains one pig. Pig loader 220 preferably has a total pig capacity equal to the pig capacity of barrel 20, so that the pig supply within barrel 20 can be maintained with a minimum of visits by ROV 200. In some preferred embodiments, barrel 20 and ROV 200 each have a pig capacity often to twenty pigs.

Figure 6:
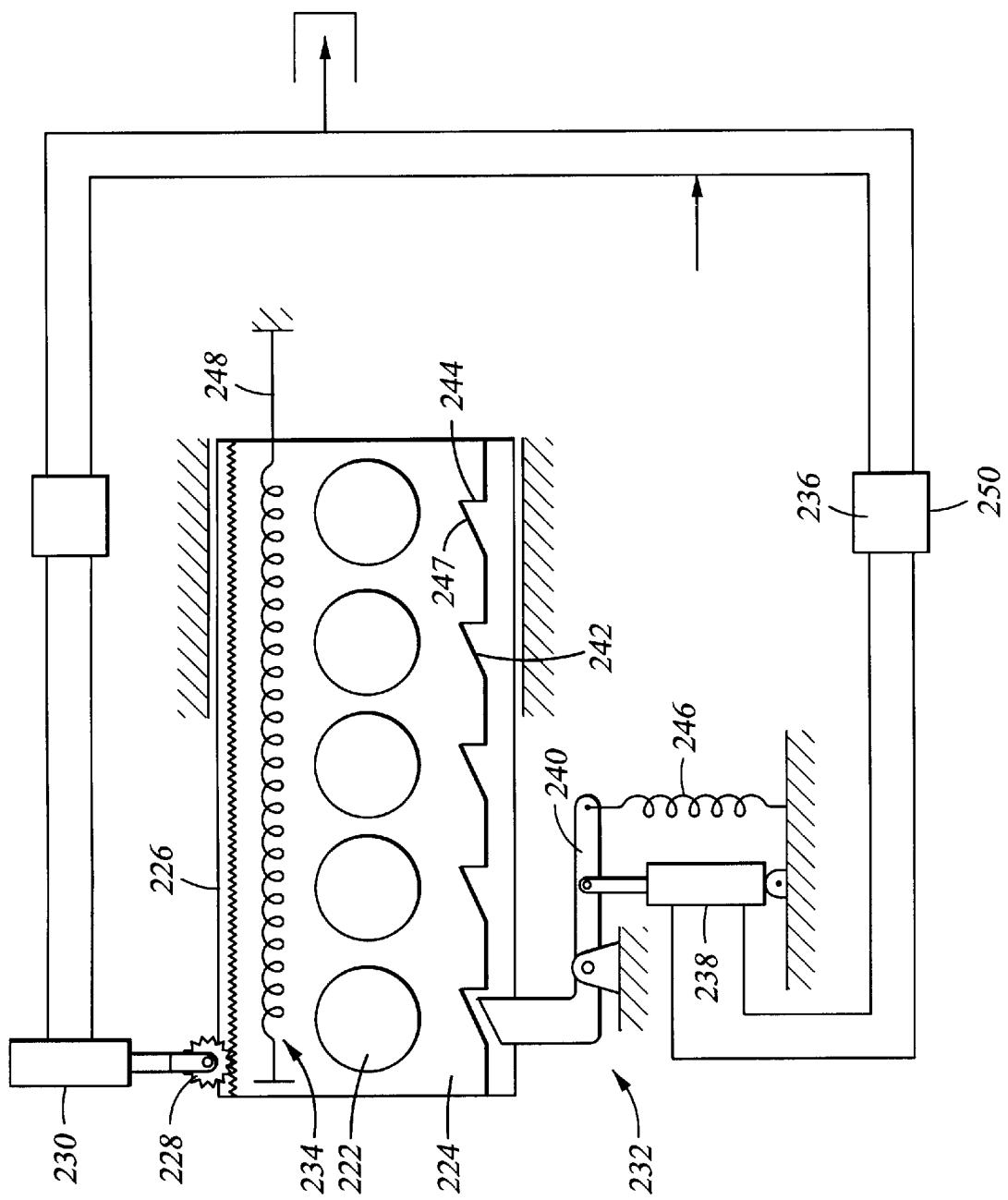
FIG. 6 is a schematic view of a preferred embodiment of a single rack used in the pig transfer equipment.

The pigs 22 are preferably retained within canisters 222 by plates 223 that form the top and bottom of the loader's frame. Referring to FIG. 6, each rack 224 preferably has a gear rack 226 that is driven by a pinion 228 and hydraulic motor 230 attached to the frame so that racks 224 are independently laterally slidable with respect to loader 220. Each rack 224 also preferably has a positive stop system 232 so that rack 224 is properly positioned when a pig 22 enters the barrel 20. As described in detail below, the pig loader 220 is also equipped with a return system 234 to retract the racks 224 in the event of loss of hydraulic power.

As can be seen in FIG. 6, the positive stop system 232 comprises a pawl 240 that interacts with a series of notches 242 on the rack 224. Each notch 242 has a vertical side 244 and a sloped side 247. Pawl 240 is connected to a spring 246 and is pivotally connected to a hydraulic cylinder 238. The hydraulic cylinder 238 is supplied through a hydraulic valve 236. Spring 246 biases pawl 240 into notch 242. Pawl 240 is removed from notch 242 by retracting hydraulic cylinder 238. As rack 224 deploys, pawl 240 contacts flat side 244 of notches 242 and provides a positive stop to the extending rack 224. As rack 224 retracts, pawl 240 rides up the sloped side 247 of notch 242, allowing rack 224 to retract.

Referring still to FIG. 6, return system 234 comprises a spring 248, and control mechanisms 250, 252 for hydraulic valves 236, 254. Spring 248 provides a sufficient force to retract rack 224 into loader 220. Control mechanisms 250, 252 provide a safety backup to control hydraulic valves 236, 254, respectively, in the case of loss of hydraulic or electrical power. In the event of loss of hydraulic power, control mechanism 252 blocks valve 254 so as to lock hydraulic motor 230 in place. This maintains the position of rack 224 and prevents it from sliding out of the loader and dropping the pigs. The pilot of the ROV may elect to hold or toggle one or more of the hydraulic valves. If electrical control is also lost, control mechanism 250 opens the valve 236, releasing any hydraulic pressure, so that the pawl 240 can travel freely. Also in the vent of loss of electric control, control mechanism 252 will open the hydraulic valve 254, allowing spring 248 to return rack 224 to the stored position. This is an illustration of one embodiment of a return system but other systems are feasible. It is preferred to include a return system as a backup because if hydraulic and electrical control were lost while the racks were extended recovery of the ROV would be difficult and equipment might be damaged.

The ROV mounted pig reloading system of the present invention provides several advantages over previous systems. For example, fluid separation and fluid management hardware are kept on the sea floor and remain permanently connected. This reduces the costs associated with transporting and connecting the various components of the pig launching system. Also, pigs can be loaded into the system at sea depths that are beyond the reach of divers and can be loaded without compromising accessibility, safety, endurance, force, or power. Using an ROV system with a small footprint also reduces the required size of the support vessel needed to carry out the reloading process.

In addition, the short distance path between the locating surfaces on the pig loader and the pig helps ensure proper position of the pig. The present system allows pig loading to be rapid and controlled, yet does not require that the pig storage barrel be retrieved to the surface to be reloaded. The combination of rapid loading and large tolerances reduces the opportunity for operator error and increases reliability and safety of the system.

Other advantages result from the simplicity of the pig reloading system, which does not require the use of hydraulic fluids. Because there is no need to contain pressure, and because the present pig loading apparatus does not require a high degree of accuracy, much of the structure can be made of plastic and manufactured with lower precision. This reduces the weight of the loader and significantly lowers manufacturing costs. Also, because the rack itself is lighter, more pigs can be carried.

A preferred embodiment of the system can launch pigs up to 40 cm in diameter and up to 80 cm in length.

Operation

Installing the Launcher: The pig delivery barrel 20 is installed on manifold pipe 52 using multi-bore hydraulic connector 50. The connector is preferably configured such that the connection can be made using a remotely operated vehicle (ROV), such as that shown in FIG. 4, or other suitable ROV. The ROV preferably connects hydraulic control lines and electrical signal lines on pig storage barrel 20 to a control pod (not shown) on manifold pipe 52 using flying leads. Pig storage barrel 20 is filled with seawater after installation on the manifold. All valves except branch valves 70, 74 etc., which connect the individual wells to header 200, are closed.

Loading Pigs: Referring to FIGS. 4 and 5, an ROV 200 carrying a predetermined number of pigs 22 lands on or connects to a platform 51 at the top of storage barrel 20. The debris cap is opened by the ROV 200. The loading valve 28 at the top of the barrel is opened. Also, valve 32 and vent valves 34 and 36 are opened. ROV 200 preferably loads the pigs 22 into the barrel one at a time. The last pig to be loaded is piston pig 26, after which loading valve 28 is closed.

In operation, ROV 200 carries pig loader 220 to subsea storage staging barrel 20 and positions it over the opening of the barrel. The pig loader 220 is preferably powered by a power supply on the ROV 200 and operated by the ROV pilots. With the front of the ROV braced against or connected to the top of storage barrel 20, loader 220 is activated to sequentially deposit a number of pigs into the storage barrel 20. One at a time, racks 224 slide forward incrementally so as to advance each pig-containing canister beyond the base plate and over the mouth of barrel 20, whereupon the pig drops out and enters barrel 20.

To move rack 224, hydraulic valve 254 is opened supplying fluid to hydraulic motor 230 that drives a pinion 228. The pinion 228 drives a gear rack 226 attached to rack 224 with enough force to overcome return spring 248. As the rack 224 extends, pawl 240 contacts notch 242 and stops rack 224 in the proper alignment to deposit a pig 22 into barrel 20. Hydraulic valve 236 is actuated to retract hydraulic cylinder 238 that retracts pawl 240 and allows rack 224 to continue advancing.

Once a rack 224 has been fully advanced and has deployed its last pig, it is retracted and the next rack is advanced and deploys its pig in the same manner. Once all of the pigs or the desired number of pigs have been deployed into barrel 20 and all racks 224 fully retracted, ROV 200 can depart from the subsea pigging assembly. If it is intended that ROV 200 supply only one subsea pigging facility, it is preferred that loader 220 have a capacity equal to the pig capacity of barrel 20. In the alternative, it is contemplated that an ROV 200 could support more than one loader, or that a loader 220 could have a larger capacity, so that the barrels 20 of more than one pigging operation could be re-stocked in a single trip of the ROV.

Other ROV tools, such as appendage 212, can be used to operate the valves of the manifold and the barrel 20 as needed. In the event that the preferred gravity feed of pigs becomes inoperable, the ROV tools can also serve as back-up means for deploying the pigs.

Flushing Pig Delivery Barrel: Valves 32 and 34 remain open. Valves 36 and 39 are closed. Hydraulic fluid under pressure is introduced at the bottom of the barrel by opening valve 37. The hydraulic fluid preferably has a higher density than seawater; hence it flushes the seawater from barrel 20 as it fills barrel 20 from the bottom. The seawater leaving barrel 20 exits through valves 32 and 34. Once barrel 20 is full of hydraulic fluid, which can be detected by observing the color of fluid at the vent port by the ROV 200, then valves 37, 32, 34 and 36 will be closed.

Loading Pig into Parking Chamber: Upper pig stop 42 is opened, while lower pig stop remains closed. Fluid pressure across valve 62 is equalized by opening valves 37 and 69. Then valve 62 is opened, valves 37 and 69 are closed, and crossover valve 82 is opened. By opening valves 39 and 32, hydraulic fluid pressure can be applied behind piston pig 26. This advances one pig into the pig parking chamber 40, where it is stopped by lower pig stop 44. Once a pig is received in parking chamber 40, upper pig stop 42 and valves 39 and 32 are closed. Upper pig stop 42 prevents any additional pigs from entering chamber 40 until it is desired to launch another pig.

Loading Pig into Launching Chamber: Lower pig stop 44 and valves 39 and 35 are opened. This introduces hydraulic fluid under pressure behind the pig in parking chamber 40, causing it to advance into launching chamber 60. The fluid in front of the pig is dumped into production header 100 via crossover valve 82. After the pig is inside launching chamber 60, valves 39, 35, 62 and 82 are closed.

Launching Pig: Valves 76 and 68 are opened to equalize pressure inside launching chamber 60. Valve 64 is opened. The trees are choked down as necessary. Branch valves 70, 74 on some or all wells may be closed as necessary so as to divert production flow behind the pig and launch the pig into production header 100. After the pig is detected leaving production header 100, valve 64 is closed and the wells are brought back to full production.

Flushing Kicker Line and Pig Launching Chamber: All production kicker valves 72, 76 etc. between the wells and kicker line 66 are closed. Launching chamber isolation valve 64 is closed. Valve 68 remains open. Methanol injection valve 73 and bypass valve 82 are opened. This permits flushing of kicker line 66 and launching chamber 60 with methanol so as to displace any residual hydrocarbon fluid. After flushing with methanol, valves 82, 68, and 73 are closed. To flush launching chamber 60 with hydraulic fluid, which is optional, valves 82 and 69 are opened and high pressure control fluid is allowed to flush launching chamber 60. The excess control fluid is pushed into production header 100 via valve cross-over 82. After a sufficient time to ensure that chamber 60 is filled with control fluid, valves 82 and 69 are closed.

At this point, the pig launcher is ready to launch another pig into the flowline. Each launch cycle includes the steps of flushing the components of the apparatus with a hydraulic or control fluid. The time period between launchings will vary, depending on the rate at which the downstream flowline accumulates buildup. During this time, the pigs may be sitting in the storage barrel for a period as long as one to two years. The last pig i.e., piston pig 26 is launched in the same manner as the other pigs.

It is preferred that each valve in the present system be remotely actuable. The valves can be hardwired to a controller, or can be configured to respond to radio, acoustic, electric, hydraulic or other types of signal. In addition, a microprocessor (not shown) can be provided for operating the various valves in sequence.

Although the invention is intended for deepwater pigging operations, it can be also used for pigging of flowlines in shallow water with the benefit of eliminating any diver intervention during such operations and also reducing the frequency of offshore intervention. The method and apparatus of the present invention make it possible to launch as many pigs as may be needed from a remote pig launcher without disconnecting the pig storage barrel from the launching apparatus. Also, because it separates pig storage and parking from pig launching, the present invention makes it possible to store the pigs in a hydraulic or control fluid that will not degrade the material from which they are made, and yet does not require the large volume of hydraulic or control fluid that would be needed if the same fluid were used to launch the pigs.

While a preferred embodiment of the present invention has been described, it will be understood that various modifications thereto can be made without departing from the scope of the present invention. For example, the precise positioning of various components can be altered, the number and nature of various components, including barrels, chambers, accumulators and lines, can be altered, and the control and orientation of various components can be modified without affecting the operation of the present system. Likewise, while various steps may be disclosed or claimed in a particular order herein, it is not intended that any particular order be required unless such order is inherent in the carrying-out of the claim or explicitly recited.

What is claimed is:

1. A pig loader, for use with a remotely operated subsea vehicle, comprising:
    at least one rack, said rack being slidable with respect to the vehicle and supporting at least one canister for containing a pig, and
    a drive mechanism engaging said rack, said drive mechanism advancing said rack such that the pig is released from its canister.

2. The pig loader according to claim 1 wherein said drive mechanism is hydraulically powered.

3. The pig loader according to claim 1 wherein said drive mechanism is electronically controlled.

4. The pig loader according to claim 1 wherein said drive mechanism includes a mechanical safety system that retracts said rack if hydraulic power is lost.

5. The pig loader according to claim 4 wherein said safety system retracts said rack automatically if electric and hydraulic control are lost.

6. The pig loader according to claim 1 including at least two racks.

7. The pig loader according to claim 6 wherein said racks are adjacent to one another and substantially parallel.

8. The pig loader according to claim 6 wherein each rack supports at least five canisters.

9. The pig loader according to claim 6 wherein said racks are configured such that only one pig is released at a time.

10. The pig loader according to claim 1 wherein said pigs are released without the use of hydraulic pressure.

11. The pig loader according to claim 1 wherein said rack is made of plastic.

12. A method for loading pigs into a subsea pig launcher barrel from a vessel at the sea surface, the method comprising:
    loading one or more pigs into a pig loader;
    lowering the pig loader from the surface to the subsea pig launcher barrel;
    transferring the pigs from the pig loader into the barrel; and
    retrieving the pig loader to the surface.

13. The method of claim 12 wherein the pig loader includes a rack for storing pigs.

14. The method of claim 13 wherein the pigs are transferred from the pig loader to the barrel by extending the rack.

15. The method of claim 12 wherein the pig loader is lowered to the barrel by a remotely operated subsea vehicle.

* * * * *